United States Patent [19]

Swensen

[11] Patent Number: 5,020,288

[45] Date of Patent: Jun. 4, 1991

[54] METHOD TO PROTECT GLASS IN DOORS AND WINDOWS FROM SCRATCHES, ABRASION, AND PAINTING PROCESSES

[76] Inventor: William B. Swensen, 1219 Creso Rd. South, Spanaway, Wash. 98387

[21] Appl. No.: 536,476

[22] Filed: Jun. 12, 1990

[51] Int. Cl.[5] .......................... E06B 1/00; B32B 17/00; C03C 11/00

[52] U.S. Cl. ........................................ 52/202; 52/741; 52/745; 52/788; 52/790; 52/DIG. 12; 156/99

[58] Field of Search ......... 52/202, 741, 745, DIG. 12, 52/788, 790; 156/99, 106, 108

[56] References Cited

U.S. PATENT DOCUMENTS

| | | | |
|---|---|---|---|
| 3,575,790 | 4/1971 | Fleck | 156/99 X |
| 4,075,386 | 2/1978 | Willdorf | 156/99 X |
| 4,657,796 | 4/1987 | Musil et al. | 156/99 X |
| 4,971,130 | 11/1990 | Bentley | 52/202 X |

Primary Examiner—Richard E. Chilcot, Jr.
Assistant Examiner—Deborah McGann Ripley
Attorney, Agent, or Firm—Dickstein, Shapiro & Morin

[57] ABSTRACT

A method of and system for protecting each side of a pane of glass during the manufacture, shipping, finishing and installation processes of a glazed building material is disclosed in which each side of each pane of glass is covered with a protective coating material prior to its installation in a frame. After the building product containing the frame is installed in a building and all finishing of the frame has been completed, the protective coating material may be cut away along the inside edges of the frame, leaving a coating of protective material along the outside edges of each side of each pane of glass, sandwiched between the frame and each side of each pane of glass, which provides a waterproof and airtight gasket or seal between each pane of glass and the unfinished portion of its frame.

17 Claims, 3 Drawing Sheets

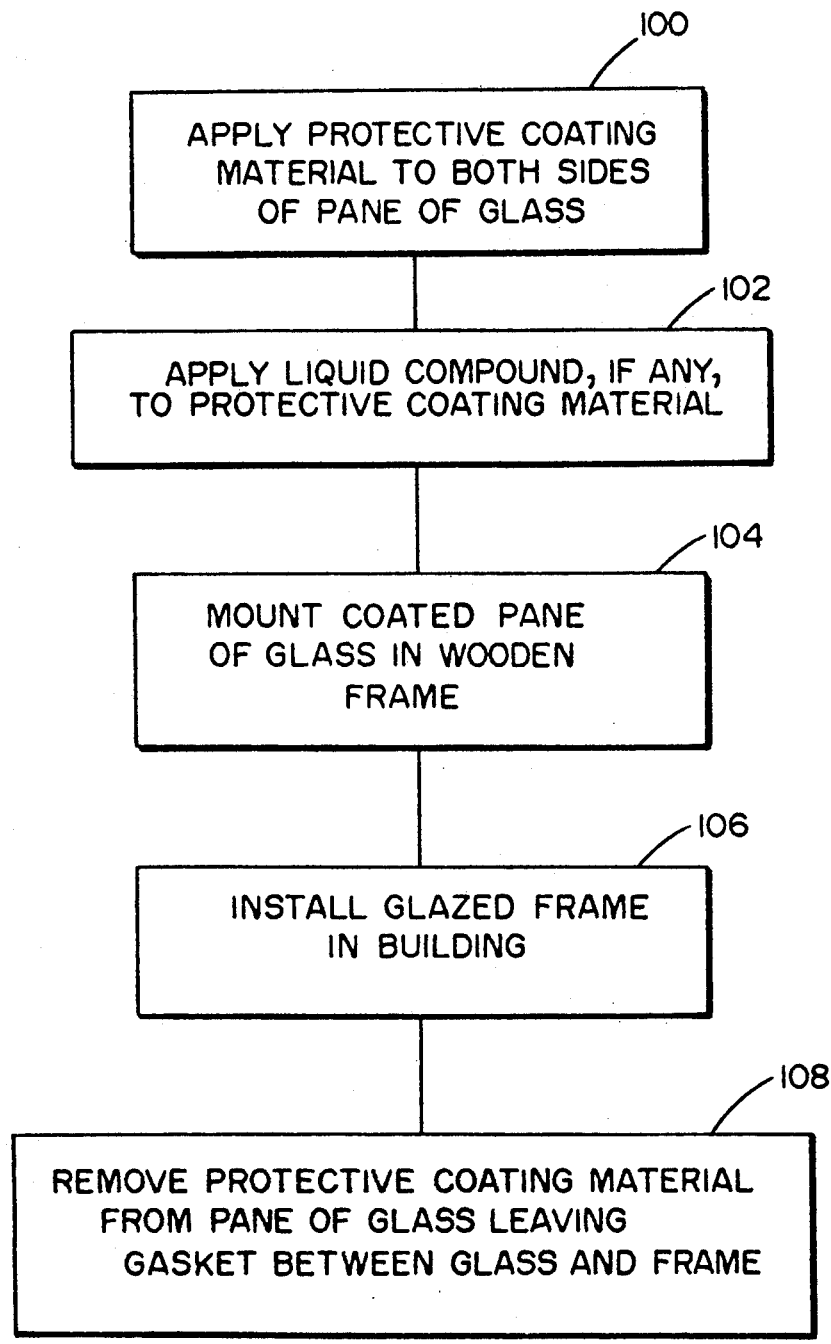

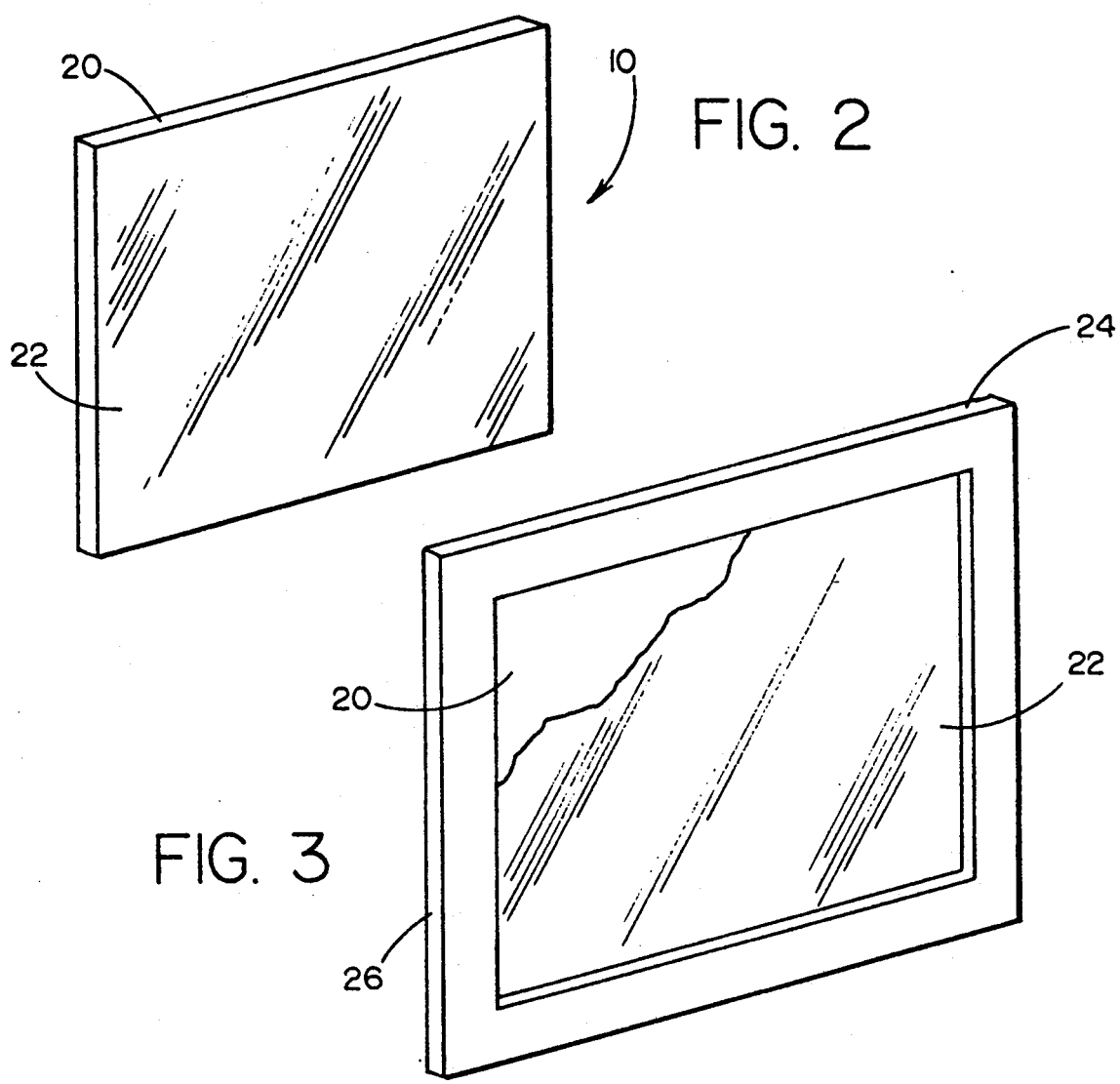
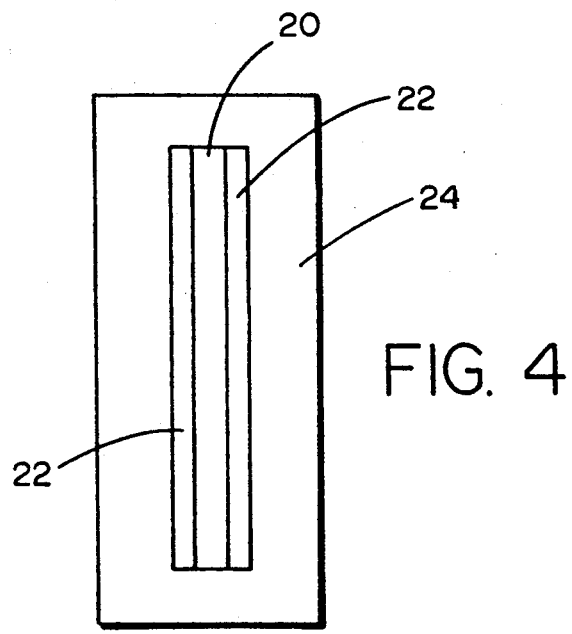

METHOD TO PROTECT GLASS IN DOORS AND WINDOWS FROM SCRATCHES, ABRASION, AND PAINTING PROCESSES

BACKGROUND OF THE INVENTION

The present invention relates generally to a process for protecting panes of glass which are assembled into doors, window frames or grids, during the manufacturing, shipping and installation processes. More particularly, the present invention relates to a method of and system for protecting glass beginning with the door, window frame or grid manufacturing process through the ultimate installation of the article containing the glass which also provides a waterproof gasket between the glass and the wood or metal frame into which it is assembled.

During the process of manufacturing doors, windows, grids and other building materials which utilize at least one pane of glass, there are many ways in which the glass can be damaged prior to the ultimate installation of the product which includes the glass. For example, the glass can be scratched either during handling prior to manufacturing, during the manufacturing process, or any time thereafter and prior to the time of the installation of the product containing the glass. In addition, the glass can be damaged during shipping from the manufacturer to the ultimate purchaser. Also, after the product has been glazed, it may be sanded, patched, painted, puttied and finally installed. If the product, for example, a door, is to be painted or stained, then typically the glass must be masked in order to prevent the stain or paint from adhering to the glass. Although paint, putty, bedding compounds and stain which have become adhered to the glass may generally be scraped off or otherwise removed, additional time is required. Further, because of a tempering process, the face or surface of the pane of glass is softer than untempered glass. Consequently, when cleaning or scraping the glass after it has been installed or after the door or window has been painted or stained, the glass surface may be scratched or abraded and the door or window becomes unacceptable to the customer. Furthermore, the necessity of having to mask the pane of glass prior to painting or staining the product containing the glass adds additional time, and therefore labor costs, to the cost of ultimately installing the product.

Another concern in the manufacture of products containing glass panes, and of the ultimate purchaser, is that no leakage of either air or moisture occur at the point where the glass is attached to or secured in the frame. Door and window manufacturers typically utilize putty or some other sealant between the glass and the frame surrounding it in order to prevent leakage. However, the use of such sealant requires an additional step during the manufacturing process which increases both the time to manufacturer the product and its cost of manufacture.

One approach to solving the problem of protecting glass during the manufacturing process is set forth in U.S. Pat. No. 1,256,818 to Nile. In that patent, glass panes are covered by paper protective covers by the glass manufacture before the panes are shipped. The paper protective covers have adhesive edges which must be moistened and pasted directly upon the surface of the glass s that the pane is protected against stains caused by paint, putty, oil and the like. After the glass has been inserted within its frame and all handling relative to the installation of the glass has been completed, an incision may be made along perforations provided in the paper covering such that the paper covering, minus the gummed edges, can be removed from the pane of glass. However, it is still necessary to use putty for securing the glass pane to the frame in which the glass is mounted. The putty also acts as a sealer between the glass and the window frame.

Another approach to protecting the glass pane during installation is shown in U.S. Pat. No. 3,023,464 to Zerbe. That patent shows a method of window frame installation in which the window and the glass of the window are protected by means of a single protective bag which is left on the frame when the frame is installed in a wall opening. The protective bag remains on the frame while the building remains under construction and acts as a shield for the frame and the glass. However, the Zerbe patent does not provide for protection of the glass itself during the manufacturing and finishing processes. It is directed to providing protection for the entire window frame and glass assembly during both installation of the window frame in the building and during subsequent construction on that building.

Other approaches are shown in U.S. Pat. No. 1,562,948 to Elliott and U.S. Pat. No. 2,979,025 to Mund. Both of those patents relate to window masking devices which may be utilized after the window has been manufactured and shipped to protect the window glass during the painting or staining of the frame in which the window is mounted. Note that the Elliott patent also discusses the then prior art method of pasting sheets of paper over the glass, but states that the paper is difficult to remove after the painting of the window frame has been completed.

The approach of the inventor herein to the problem is to use polyethylene heat sensitive film now commonly referred to as 'shrink-pack'. The system of the present invention preferably completely seals the pane of glass on all six surfaces so that only after the glass has been installed in the window or door frame and the door itself has been properly painted or finished and installed will the film be removed, leaving a complete seal between the glass and the unprotected surfaces of the door or window frame.

SUMMARY AND OBJECTS OF THE INVENTION

In view of the foregoing, it should be apparent that there still exists a need in the art for a method of and system for protecting panes of glass to be inserted into window frames, door frames, grids or the like in order to protect the glass surface from scratches, paint, putty or other damage during the manufacturing, shipping, finishing and installation processes for the glass-containing product. It is, therefore, a primary object of this invention to provide a method of and system for protecting panes of glass during the process of manufacturing building products containing glass panes in such a manner that the glass panes are protected from damage during manufacturing and subsequent shipping, finishing and installation of the product into a building.

More particularly, it is an object of this invention to provide a method of and system for protecting a pane of glass which also provides an air and moisture barrier between the pane of glass and the frame in which it is mounted.

Still more particularly, it is an object of this invention to provide a method of and system for protecting a pane of glass which is easy and economical to utilize and provides for labor savings during manufacturing, finishing and installation of the building product in which the pane of glass is secured.

Another object of the present invention is to provide a method of and system for protecting a pane of glass which becomes part of windows, doors, or grids and the like, in which, after the glazed building product has been stained or painted and installed in a building, may be readily removed while at the same time leaving a weatherproof seal between the pane of glass and the frame in which it is mounted.

Briefly described, these and other objects of the invention are accomplished in accordance with its system aspects by covering both faces or all surfaces of a pane of glass with a paper or plastic coating of material prior to the installation of the glass into, for example, a stile and rail door frame, a window frame or a grid. After the pane of glass has been installed into the frame, the paper or plastic material protects the glass during subsequent manufacturing, shipping, finishing and installation.

The method of the present invention is carried out by providing a paper or plastic covering over each planar surface face or all six surfaces of a pane of glass prior to the installation of the glass into a door frame, window frame, grid or the like. When paper is utilized, after the paper sheet has been placed on the pane of glass, a butyl (rubber) semi-liquid base compound manufactured by Borden Company located in Oregon and Washington states, is applied to the paper's surface. The semi-liquid penetrates the paper's surface, through the paper, to the glass surfaces, creating a gasket between the frame and the glass.

In the event that a plastic material is utilized, a polyethylene overlay having a cling factor may be used to coat both faces or all surfaces of the glass. Such plastic will stick to the glass but will not permanently adhere thereto. After the glass panes have been treated as described above, they are installed into the door frame, window frame, grid or the like. After installation of the glass-containing product into a building, the protective covering over the glass may be removed, for example, by means of any sharp instrument, thus leaving a seal or gasket between the frame and the glass. Such a seal or gasket forms a waterproof barrier between the wood, metal or plastic frame and the glass and may eliminate the need or use of putty or other sealers.

With these and other objects, advantages and features of the invention that may become hereinafter apparent, the nature of the invention may be more clearly understood by reference to the following detailed description of the invention, the appended claims and to the several drawings attached herein.

BRIEF DESCRIPTION OF THE DRAWINGS

FIG. 1 is a block diagram showing the method of practicing the present invention;

FIG. 2 is a diagram illustrating the system of the present invention;

FIG. 3 is a diagram illustrating the system of the present invention shown in FIG. 2 mounted in a frame;

FIG. 4 is a side view of FIG. 3;

DETAILED DESCRIPTION OF THE PREFERRED EMBODIMENT

Figure 5:
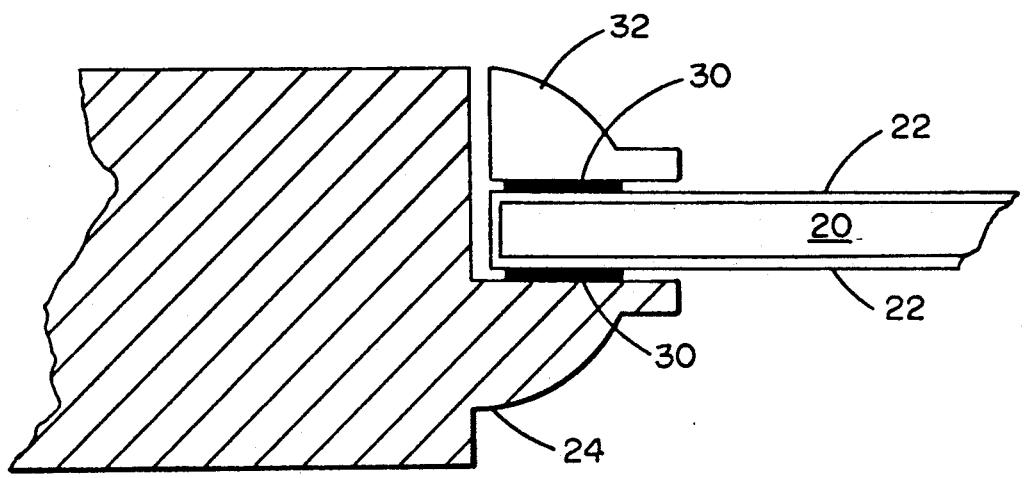
FIG. 5 is a cross-section side view of FIG. 3 showing a part of the frame, beading, glass, protective coating and bedding or glazing compound.

Referring now in detail to the drawings wherein like parts are designated by like reference numerals throughout, there is illustrated in FIG. 1 the steps of accomplishing the present inventive method. As shown in FIG. 1, a pane of glass to be protected has a protective coating of material applied to both of its planar surfaces or all of its six sides at step 100. The protective coating of material may be either a sheet of paper, such as news print available from paper mills such as Tacoma News Print Co. or a sheet of polyethylene overlay having a cling factor or heat sensitive characteristics. Such polyethylene may be a product known as linear low density polyethylene film having a cling characteristic, available from Princeton Packaging, Inc. of Dallas, Tex. and others. Alternatively, a plastic spray coat may also be utilized. In the preferred embodiment, the plastic film available from Princeton Packaging or heat sensitive (Shrink-Pac) polyethylene is utilized.

In the event that a paper sheet is used to cover each side of each pane of glass, a butyl (rubber) base compound called Pecora AC-20, available from many sources, is applied to the paper after it is placed on the glass such that it penetrates through the paper's surface, through the paper and contacts the glass upon which the paper is resting, at step 102. It causes the paper to adhere to the glass such that a gasketing effect occurs between the frame and the pane of glass after the manufacture of the building article in which the pane of glass is disposed. In a like manner, the polyethylene film forms a waterproof gasket or seal between the frame and the pane of glass. However, when a plastic coating is utilized, it may not be necessary to utilize step 102 of the method shown in FIG. 1.

It should be recognized that in almost every case the window or door frame surface to which the glass is applied has no protective coating. Whenever the instant inventive process is used, a protective coating or gasket formed by the instant invention will prevent water or other liquids from penetrating the unprotected surface. (See FIG. 5.)

After the protective coating has been applied to both sides of the pane of glass as discussed in connection with steps 100 and 102, if necessary, then the coated pane of glass is mounted in a frame at step 104. The frame may be formed of a window frame, a door frame, a door having a stile and rail structure, a grid structure or the like. The frame may be constructed of wood, metal, plastic or any other suitable material. After each pane of glass is mounted within the frame, while the window, door, grid or the like is finished being manufactured, the protective coating covers the entire pane of glass on both faces. If the inventive method is practiced with the plastic film commonly called 'shrink-pack', then all six surfaces of the glass pane will be sealed.

The finished building products are then bundled together and shipped to a local wholesaler who ultimately sells the product to the end user. The end user installs the glazed frame in a building at step 106. Either before or after the installation of the glazed frame in which each of the panes of glass is protectively coated as described above, the frame may be painted, stained, sanded or otherwise prepared for its final installation.

During those procedures, as well as during the shipping and the manufacturing of the door or other glazed building product, the protective coating serves to prevent scratches or other abrasion of the glass and to protect the glass from the paint or stain which is utilized to finish the frame.

For example, the frame can be readily spray painted without the necessity of masking or further protecting the glass and without the necessity of having to clean the glass after the frame is painted. Thus, during the various pre-hanging, pre-finishing and painting processes, there is no need to be concerned about scratching or applying paint or stain to the glass, as it is already protected.

After the frame has been properly installed in the building, the protective coating may be removed from each side of the pane of glass by cutting the covering along the outlines of the frame and removing it from the glass, in step 108. The removal of the exposed protective coating material from each side of each pane of glass leaves that portion of the protective material trapped between the wood frame and each side of each pane of glass intact. That remaining protective coating material forms a gasket between each side of each pane of glass and its respective frame or bead, which gasket is airtight and waterproof. And, it further protects the unprotected surface of the frame.

Referring now to FIGS. 2 and 3, there is shown the system 10 of the present invention which is comprised of a pane of glass 20 having affixed to at least each surface thereof a protective coating 22 as previously described. Each glass/protective coating assembly 10 may be mounted in a frame 24 in such a manner that the frame 24 covers a portion of the outside edge of each planar side of each pane of glass 20 as well as all four edges.

As shown in FIG. 4, which is a side view of edge 26 of the frame 24 of FIG. 3, opened up to show the glass 20 and protective coating 22, the protective coating 22 placed over each side of the pane of glass 20 is sandwiched between the inside edges of the frame 24 such that, when the exposed protective coating 22 is cut away along the inside edges of the frame 24, as partially shown in FIG. 3, the remaining protective coating material 22 forms a gasket or seal between the pane of glass 20 and its respective frame 24. As discussed above, that seal is both airtight and waterproof.

FIG. 5 shows a cross-section side view, of the frame of FIG. 3 in which the glass pane 20, which is covered on all six sides by a paper or polyethylene coating 22 is shown mounted between the frame 24 and a bead 32. A layer of butyl semi-liquid may be placed between the frame 30 and the protective coating 22 and the bead 32 and the protective coating at each respective side of the glass pane 20.

Figure 6:
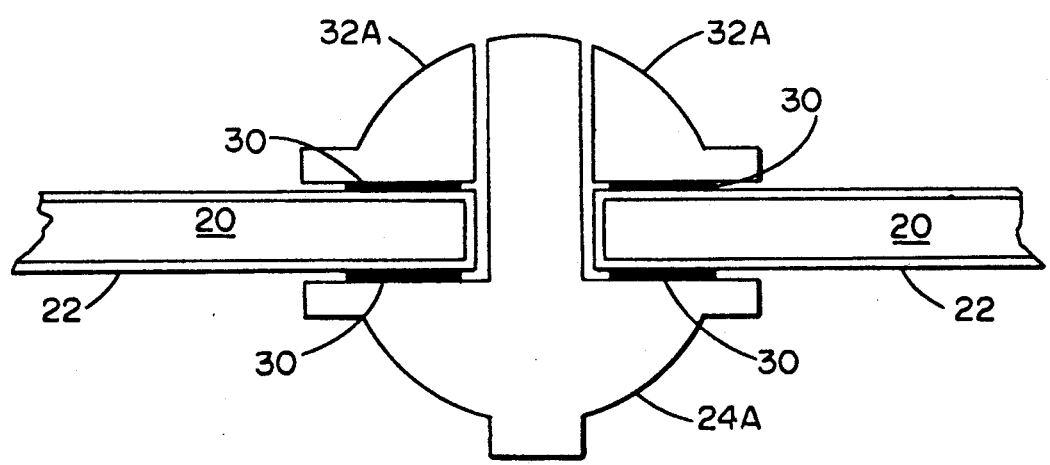
FIG. 6 is a cross-sectional view of a typical application of the present invention using a double bedding system.

FIG. 6 shows a cross-section of a typical application of the present invention using a double bedding system. A single bedding system may alternatively be utilized. A frame 24A has two glass panes 20, each of which is covered on all six sides by a paper or polyethylene protective coating 22, and is mounted and secured to the frame 24A and two beads 32A. A butyl base semi-liquid bedding compound 30 is utilized between the protective coating 22 and the beads 32A and frame 24A. However, only a single layer of bedding compound 30 between the protective coating 22 may be utilized for each pane of glass 22. As in FIG. 5, FIG. 6 shows the protective coating 22 prior to the removal of the exposed portion, which normally occurs after installation of the glazed building material in which the protected glass is mounted.

It should be understood that the method and system of the present invention may be successfully used in connection with the glazing of any type of frame or structure.

Although only a preferred embodiment is specifically illustrated and described herein, it will be appreciated that many modifications and variations of the present invention are possible in light of the above teachings and within the purview of the appended claims without departing from the spirit and intended scope of the invention.

What is claimed is:

1. A method for producing a building product having a frame and at least one piece of glazing material having two planar surfaces and a plurality of edge surfaces secured within said frame for providing a seal between said frame and each surface of said at least one piece of glazing material, comprising the steps of:
   covering both planar surfaces of said at least one piece of glazing material with a protective coating;
   assembling said at least one piece of protected glazing material in said frame, such that a portion of said protective coating is exposed within said frame and a portion of said protective coating remains between said frame and said at least one piece of glazing material; and
   cutting and removing the exposed protective coating on said at least one piece of glazing material such that the portion of said protective coating remaining between said frame and each planar surface of said at least one piece of glazing material forms a waterproof seal between said piece of glazing material and said frame.

2. The method of claim 1, wherein said building product produced by said method is a frame comprising at least one stile and rail structure.

3. The method of claim 1, wherein said step of covering comprises forming said protective coating from a sheet of paper.

4. The method of claim 1, wherein said step of covering comprises forming said protective coating from a polyethylene film having a cling factor.

5. The method of claim 1, wherein said step of covering comprises forming said protective coating from a polyethylene heat sensitive wrap.

6. The method of claim 1, further including the step of applying said protective coating to said plurality of edge surfaces of said at least one piece of glazing material.

7. The method of claim 3, further including the step of treating the protective paper coating with a rubber base compound that soaks through said paper.

8. A system for protecting at least two surfaces of a piece of glazing material from prior to manufacturing a glazed building article until the installation of said glazed building article in a building, comprising:
   a piece of glazing material having at least two planar surfaces;
   a coating of protective material removably adhered to said at least two planar surfaces;
   a frame covering at least the outside edges of said at least two planar surfaces of said piece of glazing material leaving a portion of said coating of protective material exposed within said frame and a portion of said coating of protective material covered by said frame; and a seal formed between said frame and said at least two planar surfaces of said piece of glazing material by said covered portion of said coating of protective material after the exposed portion of said coating of protective material is removed.

9. The system of claim 8, wherein said glazed building article is a frame constructed of at least one of wood and metal.

10. The system of claim 8, wherein said frame comprises at least two stile and rail structures.

11. The system of claim 8, wherein said protective coating is formed from a sheet of paper.

12. The system of claim 8, wherein said protective coating is formed from a polyethylene film having a cling factor.

13. The system of claim 11, further including a rubber compound coating applied to said sheet of paper.

14. The system of claim 8, wherein said piece of glazing material further comprises a plurality of edge surfaces and wherein said plurality of edge surfaces are covered by said protective coating.

15. The system of claim 8, wherein said protective coating is formed from polyethylene heat sensitive wrap.

16. The system of claim 8, wherein said protective coating is applied to said piece of glazing material before it is installed in said glazed building article.

17. The system of claim 8, wherein said frame includes inside unprotected surfaces which are protected by said coating of protective material after said piece of glazing material is installed in said frame.

* * * * *

UNITED STATES PATENT AND TRADEMARK OFFICE
CERTIFICATE OF CORRECTION

PATENT NO. : 5,020,288
DATED      : June 4, 1991
INVENTOR(S) : WILLIAM B. SWENSEN It is certified that error appears in the above-identified patent and that said Letters Patent is hereby corrected as shown below:

On the title page, item (56):

REFERENCES CITED:

| PATENT NO. | PATENTEE | ISSUE YEAR |
|---|---|---|
| 1,256,818 | H.J. Nile | 1918 |
| 1,562,948 | R. Elliott | 1925 |
| 2,004,878 | M.S. MacNaught | 1935 |
| 2,979,025 | M. Mund | 1961 |
| 3,023,464 | R.M. Zerbe | 1962 |
| 3,077,059 | R.K. Stout | 1963 |
| 3,139,352 | E.C. Coyner | 1964 |
| 3,358,355 | Dale J. Youssi et al. | 1967 |

Signed and Sealed this

Nineteenth Day of October, 1993

Attest:

BRUCE LEHMAN

*Attesting Officer*  *Commissioner of Patents and Trademarks*